United States Patent
Gao et al.

(10) Patent No.: US 10,503,939 B2
(45) Date of Patent: Dec. 10, 2019

(54) METHOD AND APPARATUS FOR ENERGY HARVEST FROM A PROXIMITY COUPLING DEVICE

(71) Applicant: Intel Corporation, Santa Clara, CA (US)

(72) Inventors: Jie Gao, Sunnyvale, CA (US); Xintian E. Lin, Mountain View, CA (US); Anand S. Konanur, Sunnyvale, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,344

(22) Filed: Dec. 24, 2014

(65) Prior Publication Data
US 2016/0188919 A1    Jun. 30, 2016

(51) Int. Cl.
G06K 7/10    (2006.01)
G06K 19/07    (2006.01)

(52) U.S. Cl.
CPC ..... G06K 7/10158 (2013.01); G06K 19/0709 (2013.01)

(58) Field of Classification Search
CPC ........... G06K 7/10158; G06K 19/0707; G06K 19/0708; G06K 19/0709; H02J 7/025
USPC ......................................................... 235/492
See application file for complete search history.

(56) References Cited

U.S. PATENT DOCUMENTS

| | | | | |
|---|---|---|---|---|
| 2006/0022042 | A1* | 2/2006 | Smets | G01R 31/302 235/451 |
| 2011/0260839 | A1* | 10/2011 | Cook | G06K 19/0708 340/10.4 |
| 2012/0214418 | A1 | 8/2012 | Lee et al. | |
| 2012/0280575 | A1 | 11/2012 | Kim et al. | |
| 2013/0057070 | A1* | 3/2013 | Onishi | G06K 19/0709 307/43 |

(Continued)

FOREIGN PATENT DOCUMENTS

| CN | 103988393 A | 8/2014 |
|---|---|---|
| CN | 104077620 A | 10/2014 |

(Continued)

OTHER PUBLICATIONS

Xiao Lu et al., Wireless Charger Networking for Mobile Devices: Fundamentals, Standards, and Applications, arXiv:1410.8635v2 [cs.NI], Dec. 9, 2014, 16 pages.

(Continued)

*Primary Examiner* — Laura A Gudorf
(74) *Attorney, Agent, or Firm* — Spectrum IP Law Group, LLC

(57) ABSTRACT

The disclosure generally relates to a method and apparatus for energy harvest from a proximity coupling device (PCD) by a proximity integrated circuit card. In one embodiment, the PICC includes an integrated BLE. The BLE may be exclusively charged by the external magnetic field received from the PCD. The PCD may be configured to detect when the PICC is nearby and increase its duty cycle to thereby increase the magnetic field imposed on the PICC. The PICC may include circuitry to receive and convert the magnetic field to electric potential or voltage. The voltage may be store at a capacitor for BLE's usage.

14 Claims, 5 Drawing Sheets

(56) References Cited

U.S. PATENT DOCUMENTS

| | | | |
|---|---|---|---|
| 2013/0207599 A1* | 8/2013 | Ziv ...................... | H02J 5/005 320/108 |
| 2013/0234528 A1* | 9/2013 | Kargl .................... | H02J 5/005 307/104 |
| 2013/0257364 A1* | 10/2013 | Redding ................ | H02J 5/005 320/108 |
| 2014/0132210 A1 | 5/2014 | Partovi | |
| 2014/0159653 A1 | 6/2014 | Von Novak et al. | |
| 2014/0285416 A1* | 9/2014 | Priyantha ............. | H04B 5/0037 345/156 |
| 2015/0249359 A1* | 9/2015 | Gunderson ........... | H02J 7/0047 320/108 |
| 2016/0004945 A1* | 1/2016 | Wade ................. | G06K 19/0715 235/492 |

FOREIGN PATENT DOCUMENTS

| | | |
|---|---|---|
| KR | 10-2002-0028643 A | 4/2007 |
| KR | 10-1046659 | 7/2011 |
| WO | 2013/151831 A1 | 10/2013 |
| WO | 2014/049593 A2 | 4/2014 |

OTHER PUBLICATIONS

International Search Report and Written Opinion Received for PCT Application No. PCT/US2015/061855, dated Mar. 3, 2016, 13 pages.

Office Action received for Taiwanese Patent Application No. 104138739, dated Oct. 21, 2016, 9 pages of Taiwanese Office Action including 1 pages of English Search Report.

Letters of Patent received for Taiwanese Patent Application No. 104138739, dated Aug. 21, 2017 as Patent No. I596548, 2 pages including 1 page of English translation.

International Preliminary Report on Patentability received for International Application No. PCT/US2015/061855, dated Jul. 6, 2017, 10 pages.

Notification of Publication of Patent Application for Invention for Chinese Patent Application No. 201580064305.1, dated Nov. 1, 2017. Published as Chinese Publication 107257979, the Chinese counterpart of subject US application.

Office Action received for European Patent Application No. 15873950.8 dated Feb. 1, 2019, 8 pages.

Extended European Search Report received for European Patent Application No. 15873950.8, dated May 24, 2018, 11 pages.

Office Action received for Korean Patent Application No. 2015-0163836 dated Sep. 14, 2018, 12 pages including 6 pages of English translation.

Office Action received for Korean Patent Application No. 2015-0163836, dated Feb. 28, 2019, 7 pages, including 3 pages of English translation.

Notice of Allowance received for Korean Patent Application No. 2015-0163836, dated Apr. 24, 2019, 6 pages, including 1 page of English translation and 3 pages of allowed claims in English.

Office Action received for European Patent Application No. 15873950.8, dated Apr. 15, 2019, 8 pages.

Office Action Received for Indian Patent Application No. 6164/CHE/2015, dated Jan. 22, 2019, 6 pages.

Patent Certificate received for Korean Patent Application No. 2015-0163836 issued as Patent No. on 10-2005460 on Jul. 30, 2019, 3 pages.

Office Action received for European Patent Application No. 15873950.8 dated Sep. 4, 2019, 5 pages.

* cited by examiner

| bit | field |
|---|---|
| b1 | Bit frame anticollision |
| b2 | |
| b3 | |
| b4 | |
| b5 | |
| b6 | RFU |
| b7 | UID size bit frame |
| b8 | |
| b9 | Proprietary coding |
| b10 | |
| b11 | |
| b12 | |
| b13 | RFU |
| b14 | |
| b15 | |
| b16 | |

*FIG. 4*

METHOD AND APPARATUS FOR ENERGY HARVEST FROM A PROXIMITY COUPLING DEVICE

BACKGROUND

Field

The disclosure relates to a method, apparatus and system to use a proximity coupling device to charge a proximity integrated chip card equipped with an auxiliary communication platform.

Description of Related Art

Conventional proximity cards are a type of smartcard that can be read without inserting it into a reader device. Earlier generation of identification cards had a magnetic strip that required contact or insertion through a magnetic reader to be read. The new generation of smart or proximity cards may be held near an electronic reader or a proximity coupling device (PCD) for a moment in order to be read or to exchange information. The reader usually produces a beep or other sounds to indicate the card has been read. Proximity cards typically have a reading range of around 2-8 inches. Typical proximity cards include 125 kHz (older versions) devices or the 13.56 MHz (newer) contactless smartcards. Smartcards are either active or passive.

The card and the reader unit communicate with each other through radio frequency fields and a resonant energy transfer process. Passive cards have three components, sealed inside the plastic: an antenna consisting of a coil of wire, a capacitor and an integrated circuit (IC), which contains the user's ID number or other data. The reader unit has its own antenna, which continuously transmits a short range radio frequency magnetic field.

A passive card is charged by the reader device. When the card is placed within range of the reader, the antenna coil and capacitor, which form a tuned circuit, absorb and store energy from the field. The energy is then rectified to direct current to power the IC. Because all the energy to power the card comes from the reader unit, passive cards must be close to the reader to function. Consequently, the have only a limited range. An active card is powered by a lithium battery. The active card's IC includes a receiver which uses the battery's power to amplify the signal from the reader unit so it is stronger and can detect the reader at a greater distance away. The battery powers signal transmission from the smartcard.

BRIEF DESCRIPTION OF THE DRAWINGS

These and other embodiments of the disclosure will be discussed with reference to the following exemplary and non-limiting illustrations, in which like elements are numbered similarly, and where:

FIG. 4 illustrates an exemplary bit mapping of an ATQ command according to one embodiment of the disclosure.

DETAILED DESCRIPTION

Figure 1:
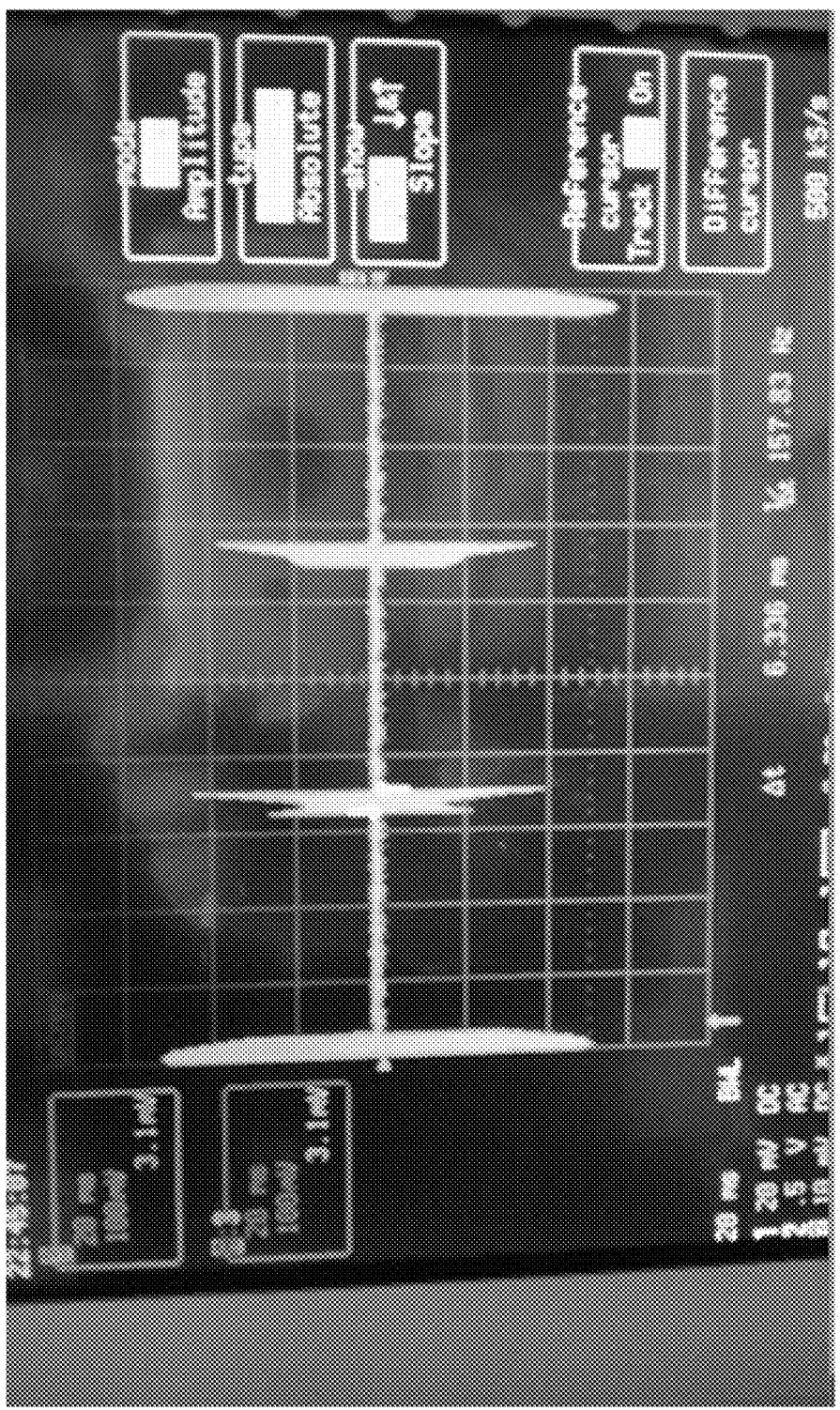
FIG. 1 shows the polling cycle of a representative PCD device (i.e., a badge reader) measured with an oscilloscope.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HD™ specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

In one embodiment, the disclosure relates to a PICC with an integrated auxiliary communication platform. In one embodiment, the auxiliary communication platform is a BLE radio. The PICC may be passive (operate without battery) and may be configured for near-field communication. The BLE platform may be configured to send and receive regular beacon signals. The BLE may be configured to provide login assistance when near a secure device, for example, by autonomously exchanging login credentials.

An exemplary PICC may harvest energy from a proximity coupling device (PCD) such as a badge reader when the PICC is scanned (interchangeably, tagged) against the PCD. Scanning may be done when the user scans the badge to access the premises. The badge may store the energy in a capacitor and sustain the power consumption of a BLE radio for user proximity presence and location detection for a duration (e.g., an entire day). In one embodiment, the PCD is configured to recognize the PICC's presence and increase its polling cycle to effectively charge the PICC during a short scanning duration. In another embodiment, a near-field communication (NFC) reader or other compatible magnetic field generating devices (e.g., ISO 14443, 18002 or 15693 standard devices) may be used as an energy source.

In another embodiment, the disclosure integrates a BLE radio with the PICC such that the BLE radio is charged by the PCD. This may obviate the need for an external battery. The PICC may be used in different applications. For example, the PICC may be used for logging into a PC, it may be configured so as to conserve power for the PC when inactive, or be used for maintaining PC settings or home/office automation.

ments, the energy transmitted from the PCD is harvested to sustain the power consumption of the BLE radio embedded in the PICC. Because the disclosed device does not require a battery, it is light and easy to carry. The disclosed embodiment is advantageous over using a conventional NFC radio because the latter requires an NFC reader to be installed on existing host computers and PCs.

TABLE 1 shows the results of a feasibility study directed to an embodiment of the disclosure. Specifically, TABLE 1 shows power consumption of a representative BLE.

TABLE 1

| Power consumption data for an exemplary BLE device | | |
|---|---|---|
| Current consumption for BLE beacon sent every 5 sec (A) | Voltage (v) | Required Energy to sustain 8-hr BLE (Joule) |
| 3.1E−06 | 1 | 0.08928 |

TABLE 1 shows that the current consumption for sending a BLE advertisement is about $3.1 \times 10^{-6}$ A. A conventional BLE device sends a beacon signal every 5 seconds. Thus, the energy required to sustain an eight hour charge for such a BLE device is about 0.08928 J.

FIG. 1 shows the polling cycle (interchangeably, duty cycle) of a representative PCD (i.e., a badge reader) measured with an oscilloscope. As shown in FIG. 1, the polling cycle of an exemplary PCD is about 10%. In FIG. 1, the peaks show instances where the magnetic field is ON and the valleys show instances where the generated magnetic field is OFF. Thus, FIG. 1 shows duty cycle of a conventional PCD.

TABLE 2 shows the energy harvest results from a PCD. Specifically, the first column of TABLE 2 shows the number of turns (N) of the PICC antenna under study; the second column is the maximum magnetic field (H); the third column is the tag duration (i.e., close proximity or and/or contact between PICC and PCD); the fourth column is active period (i.e., the length of time energy is exchanged between PICC and PCD); the fifth column is the current for a chip with class I PICC antenna; the sixth column is the DC voltage that is harvested; the seventh column is the power harvested and the eight column is the energy harvested during the tag duration.

TABLE 2

| Energy Harvest from an Exemplary PCD | | | | | | | |
|---|---|---|---|---|---|---|---|
| Number of turns N of PICC antenna (72 mm × 42 mm) | Max. H field (A/m) | Tag stay/charge duration (second) | Active period (second) | Chip current with Class I PICC antenna (A) | DC volt (V) | Power harvested (Watts) | Energy harvested (Joule) |
| 4 | 7.5 | 0.64 | 0.062 | 0.03525 | 3 | 0.10575 | 0.00655 |
| 4 | 7.5 | 1 | 0.096875 | 0.03525 | 3 | 0.10575 | 0.01024 |
| 4 | 7.5 | 2 | 0.19375 | 0.03525 | 3 | 0.10575 | 0.02048 |

In certain embodiments, the disclosure provides a method and system for harvesting energy from the PCD device. Many offices are electronically secured and require swiping a badge to gain access to the premises. In certain embodi- The first row of TABLE 2 shows that when the PICC is tagged for about 64 msec, the energy active period is about 6.2 msec. Based on this measurement, harvested energy is derived at 0.00655 J. In the second row of TABLE 2, the tag period is extended to one second. The active energy harvest period is about 0.096875 seconds and the harvested energy is about 0.01024 J. The third row of TABLE 2 shows that when the tag period is increased to two seconds, the energy harvested by the PICC is about 0.02048 J.

Figure 2:
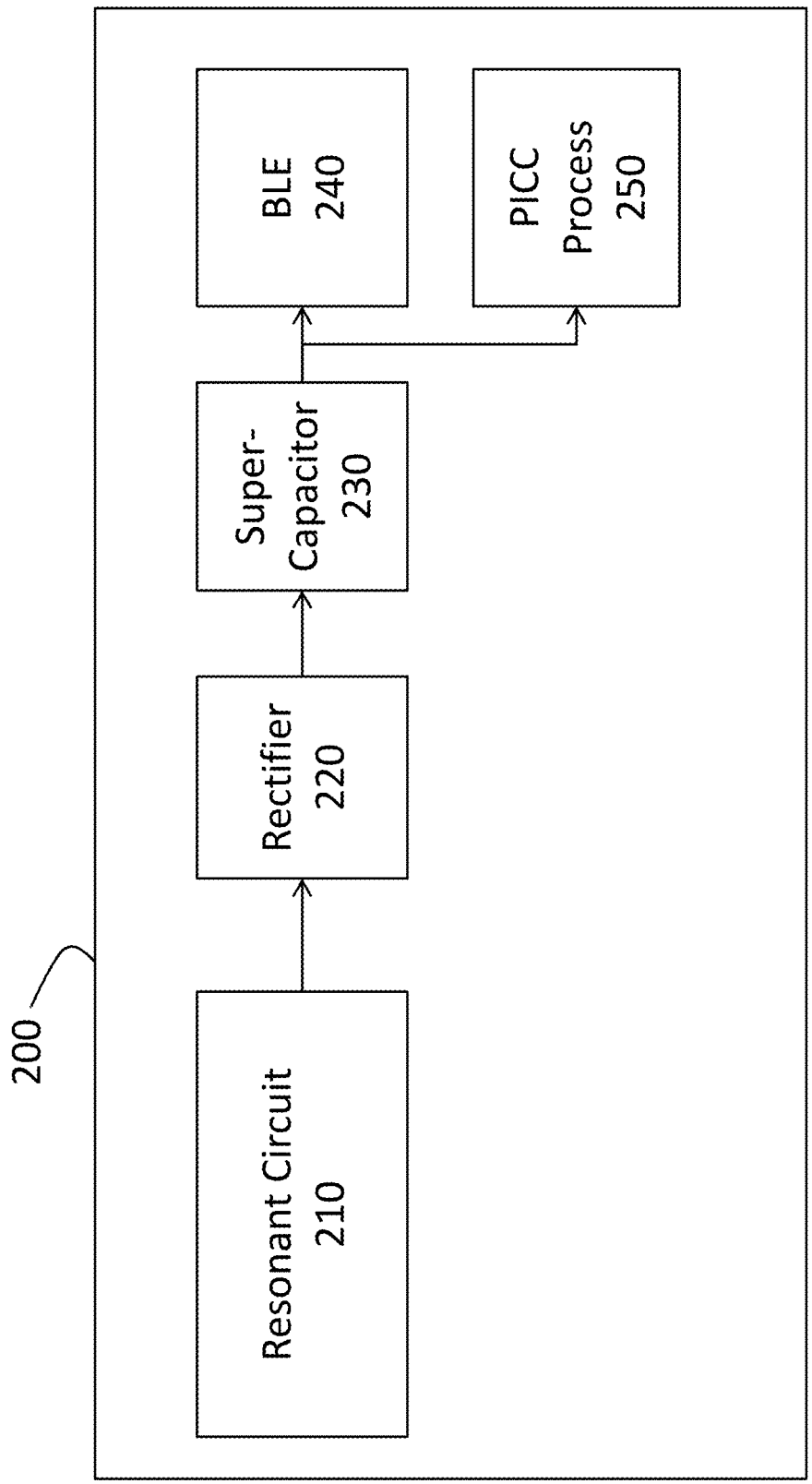
FIG. 2 is a block diagram of a proximity integrated circuit card (PICC) according to one embodiment of the disclosure.

FIG. 2 is a block diagram of a proximity integrated circuit (PICC) according to one embodiment of the disclosure. Specifically, FIG. 2 shows an exemplary embodiment of the disclosure which may be implemented on a PICC device. The PICC 200 of FIG. 2 may include a badge reader and a user may scan the badge to gain access to a building or an office.

PICC 200 may include resonant circuit 210, rectifier 220, super-capacitor 230, BLE 240 and PICC Processor 250. Resonant circuit 210 may include an antenna and a dedicated capacitor. In an exemplary embodiment, the resonant circuit may resonate at about 13.56 MHz. Resonant circuit 210 may also include a coil that absorbs energy from the PCD device (not shown). An exemplary PCD device may include a coil transmitter to emit a magnetic field which may be picked up to energize PICC 200. Rectifier 220 may be any rectifier configured to convert magnetic energy to voltage. Rectifier 220 may energize super capacitor 230 with enough energy (see e.g., TABLE 2) for BLE radio's consumption. In one exemplary embodiment, super capacitor 230 may be selected to provide enough charge for about eight hours power consumption of BLE 240. In an exemplary implementation a 0.02 Farad capacitor was used. The capacitance was large enough to obviate a backup batter in the PICC.

BLE radio 240 may include 2.4 GHz antenna and may be charged by super capacitor 230. BLE 240 may be used for proximity detection to identify nearby BLE devices. PICC processor 250 handles communication between PICC and PCD. PICC processor may comprise processor circuitry alone or in combination with software for such communication.

In one exemplary application, PICC 200 may be used as a badge to enter an office building or other secured premises. The badge may be scanned against a PCD configured to provide increased duty cycle (interchangeably, polling cycle) to charge PICC 200 during the tag time. The resonant circuit 210 of PICC 200 may detect and receive magnetic field transmitted by a PCD (not shown). The energy from the magnetic field may be converted to voltage by rectifier 220. The converted energy may be then stored on super capacitor 230 to power BLE 240.

In addition to charging PICC 200, the PCD (not shown) may read information transmitted by PICC 200 for identification and security purposes. The information may be transmitted in a conventional manner. Alternatively, the information may be in the form of BLE advertisements by BLE 240. BLE 240 includes a BLE radio.

In another embodiment, the disclosure relates to a method and apparatus for providing adaptive PCD polling cycle to harvest sufficient energy to charge the BLE device. As discussed in relation to FIG. 1 and TABLE 1, conventional PCDs emit a magnetic field during the tag period. The magnetic field and the duty cycle of the PCD may be increased according to one embodiment of the disclosure in order to enhance the charging ability of the PCD.

Figure 3:
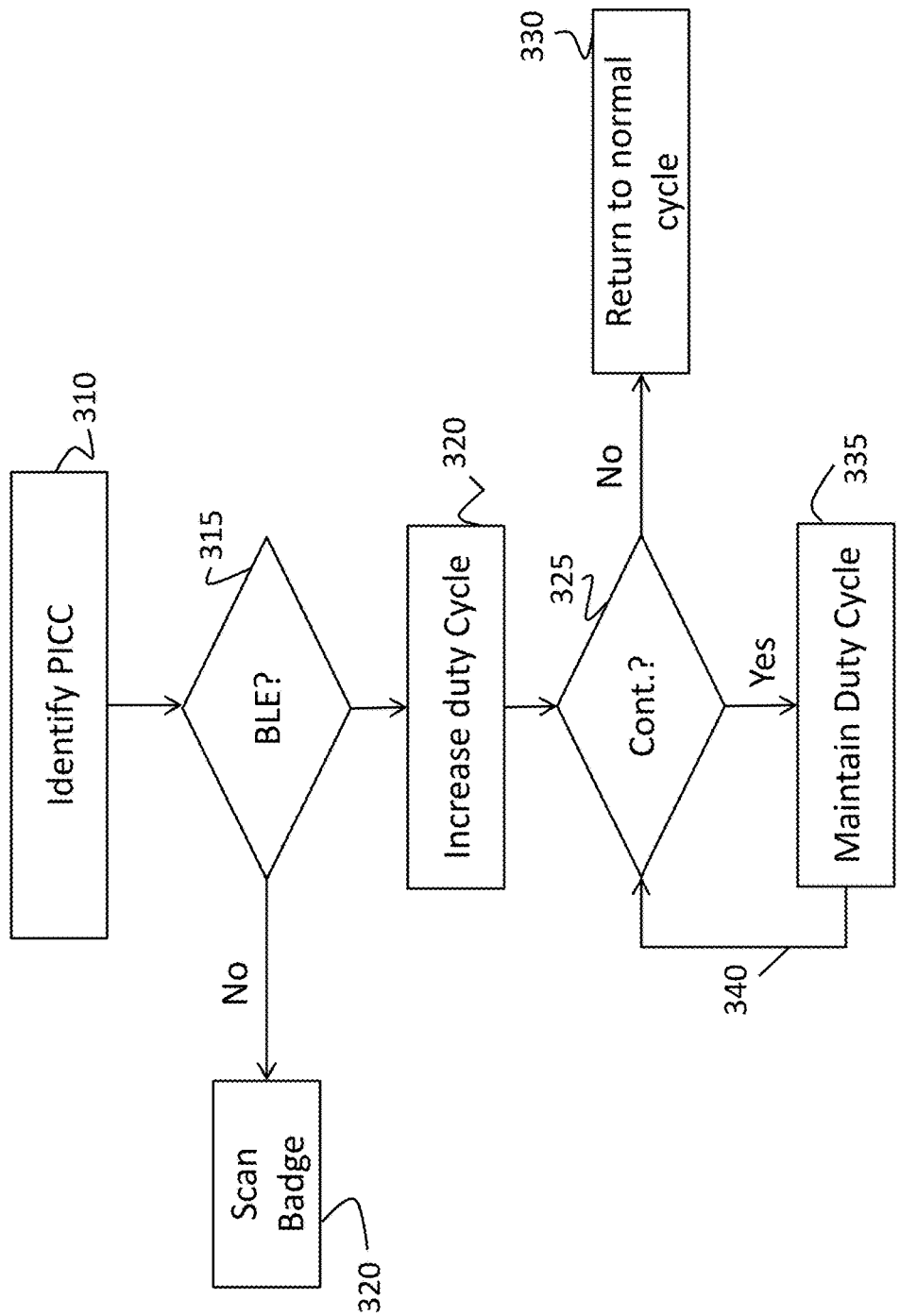
FIG. 3 is a flow diagram of an adaptive PCD charging process according to one embodiment of the disclosure.

FIG. 3 is a flow diagram of an adaptive PCD charging process according to one embodiment of the disclosure. FIG. 3 starts at step 310 when a PICC is canned (tagged) against the PCD. At step 310 the PCD identifies the PICC and at step 315 determines whether the PICC is equipped with a BLE device according to the disclosed embodiments. If the PICC device includes BLE, then at step 320 the PICCs duty cycle is increased to allow charging of the BLE device.

In an optional embodiment, the PCD may be configured to recognize the PICC and increase the duty cycle to accommodate different devices according to pre-defined parameters. For example, the PCD may be programmed to increase the duty cycle to 70% if a first group of devices are identified at step 310. Similarly, the PCD may be programmed to increase the duty cycle to 95% if a second group of devices are identified at step 310. Thus, the duty cycle may be increased according to the PICC's needs. To this end, the PCD may include one or more programmable modules (not shown) to receive a database of known PICCs and their correlating duty cycle requirements.

At step 320 the duty cycle of the PCD is increased. As stated, the average tag time is about 2 seconds. Thus, the increased duty cycle should be configured to deliver the maximum magnetic field during this brief exposure. At step 325, the PCD makes a determination whether to continue charging the PICC with increased duty cycle. The PCD may optionally detect the presence so the PICC. If the PICC is no longer present, then the PCD may return to its normal duty cycle as shown at step 330. If the PICC continues to remain within the magnetic field of the PCD, then the higher duty cycle may continue as shown in step 335. In an optional embodiment, the PICC may be configured to reduce the duty cycle if the device remains present after a predefined duration. The PCD may continually monitor presence of the PICC and repeat the cycle as shown by arrow 340.

In certain embodiments of the disclosure, the PICC communicates with the PCD through exchange of messages. The PCD may send a request (REQ) to the PICC and the PICC may respond with answer to request (ATQ). FIG. 4 illustrates an exemplary bit mapping of an ATQ command according to one embodiment of the disclosure. In FIG. 4, bits 1-5 are anti-collision bits; bit 6 and bits 13-16 are RFU (reserved for future use) bits; bits 7 and 8 are user identifier (UID) bits; and bits 9-12 are proprietary coding bits. In an implementation in an exemplary PICC card integrated with a BLE radio, bits 9-12 in the ATQ commands may be programmed to a specific pattern (e.g., 1111). When the PCD device receives and detects the ATQ command with the predefined bit pattern for BLE sensor purpose, it may set the polling duty cycle to a pre-defined percentage immediately to increase the magnetic field energy.

Figure 5:
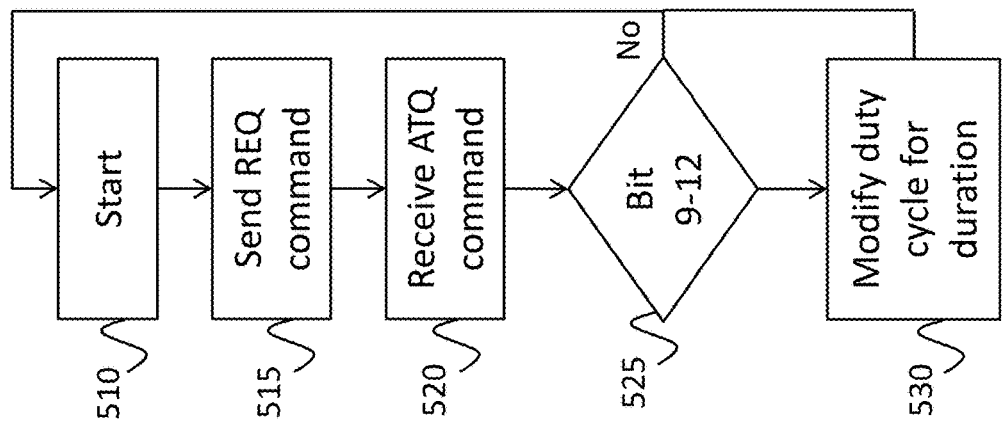
FIG. 5 shows an exemplary flow diagram for implementing an adaptive polling cycle in a PCD in communication with a PICC.

FIG. 5 shows an exemplary flow diagram for implementing an adaptive polling cycle in a PCD in communication with a PICC. The process of FIG. 5 starts at step 510. The duty cycle may be set at default value of about 10%. Once the PICC is tagged on the PCD device or when proximity is detected, the PCD sends a request (REQ) command to the PICC (see step 515). At this time, the PICC may receive the benefit of a lower magnetic field. At step 520, the PCD receives an ATQ from the PICC. At step 525, ATQ bits (b9 to b12) are is decoded. If the predefined pattern (e.g., 1111) of bits 9-12 are verified, PCD polling cycle may be modified to 100% for a predefined duration as shown in step 530. The increased polling cycle provides a larger H-field energy. As a result, the harvested energy may increase to 0.1 Joule when the badge is tagged for an additional 1-2 seconds. The harvested energy can power the BLE device for eight hours of operation. In an exemplary embodiment, the BLE beacon of the PICC device may be configured to be less active than the default beacon interval so as to conserve energy.

The steps shown in each of FIGS. 3 and 5 may be implemented in hardware, software or a combination of hardware and software. In an exemplary embodiment, the steps of FIG. 5 may be stored at a memory circuitry and implemented by a processor circuitry in communication with a PCD. The processor and the memory circuitries may each include additional hardware and software to provide the desired functionality. In another exemplary embodiment, a processor circuitry may be programmed with logic to carry out the steps shown in FIGS. 3 and 5. Other implementations of the disclosed principles are equally applicable.

The following are exemplary and non-limiting embodiments of the disclosure to illustrate various implementations of the disclosure. Example 1 is directed to a proximity integrated circuit card (PICC), comprising: a resonant circuit to receive magnetic energy from an external source; a rectifier to convert the magnetic energy received at the resonant circuit to a voltage energy; a capacitor to receive and store the voltage energy from the rectifier; and a BLE radio to electrically communicate with the capacitor and to be powered by the voltage energy stored in the capacitor.

Example 2 is directed to the PICC of example 1, wherein the BLE radio is configured to be powered exclusively by the voltage energy stored in the capacitor.

Example 3 is directed to the PICC of example 1, wherein the resonant circuit receives magnetic energy from a proximity coupling device (PCD).

Example 4 is directed to the PICC of example 3, further comprising a PICC processor to communicate with the PCD.

Example 5 is directed to the PICC of example 1, wherein the BLE is configured to communicate login information with an external device.

Example 6 is directed to a tangible machine-readable non-transitory storage medium that contains instructions, which when executed by one or more processors result in performing operations comprising: discovering a proximity integrated circuit card (PICC) within a magnetic field range of a proximity coupling device (PCD); identifying the discovered PICC as having a communication platform powered by the harvested energy; increasing duty cycle of the PCD to expose the PICC to increased magnetic field; resuming default duty cycle when the PICC is outside of the magnetic field range of the PCD.

Example 7 is directed to the tangible machine-readable non-transitory storage medium of example 6, wherein the communication platform defines a Bluetooth Low Energy (BLE) radio.

Example 8 is directed to the tangible machine-readable non-transitory storage medium of example 6, wherein discovering the PICC within the magnetic field range further comprises transmitting a request (REQ) command to the PICC and receiving an answer to request (ATQ) from the PICC.

Example 9 is directed to the tangible machine-readable non-transitory storage medium of example 8, wherein discovering the PICC within a magnetic field range further comprises determining whether a plurality of designated bits in the ATQ indicate energy harvest requirement.

Example 10 is directed to the tangible machine-readable non-transitory storage medium of example 9, wherein the instructions further comprise increasing duty cycle of the magnetic field if energy harvest requirement is indicated.

Example 11 is directed to the tangible machine-readable non-transitory storage medium of example 6, wherein the instruction further comprise detecting movement of the PICC away from the PCD.

Example 12 is directed to a proximity coupling device (PCD) comprising one or more processors and circuitry, the circuitry including: a first logic to discover a proximity integrated circuit card (PICC) within a magnetic field range of a proximity coupling device (PCD); a second logic to determine the discovered PICC as having a Bluetooth Low Energy (BLE) radio; a third logic to increase duty cycle of the PCD to expose the PICC to increased magnetic field and to resume a default duty cycle when the PICC is outside of the magnetic field range of the PCD.

Example 13 is directed to the PCD of example 12, wherein the first logic discovers the PICC within the magnetic field by transmitting a request (REQ) command to the PICC and receiving an answer to request (ATQ) from the PICC.

Example 14 is directed to the PCD of example 13, wherein the second logic determines whether a plurality of designated bits in the ATQ indicate BLE availability.

Example 15 is directed to the PCD of example 14, wherein the third logic increase duty cycle of the magnetic field for a duration only if the BLE is available.

Example 16 is directed to the PCD of example 15, wherein the first logic further detects movement of the PICC away from the PCD and causes the third logic to resume the default duty cycle.

While the principles of the disclosure have been illustrated in relation to the exemplary embodiments shown herein, the principles of the disclosure are not limited thereto and include any modification, variation or permutation thereof.

What is claimed is:

1. A proximity integrated circuit card (PICC), comprising:
   a resonant circuit to receive magnetic energy from a proximity coupling device (PCD);
   a rectifier to convert the magnetic energy received at the resonant circuit to a voltage energy;
   a capacitor to receive and store the voltage energy from the rectifier;
   a Bluetooth Low Energy (BLE) radio to electrically communicate with the capacitor and to be powered by the voltage energy stored in the capacitor; and
   a PICC processor to communicate with the PCD through the BLE radio;
   wherein the PCD is configured to detect a nearby PICC and to increase duty cycle of the PCD to expose the PICC to increased magnetic field generated by the PCD to thereby charge the PICC during the duty cycle.

2. The PICC of claim 1, wherein the BLE radio is configured to be powered exclusively by the voltage energy stored in the capacitor.

3. The PICC of claim 1, wherein the resonant circuit receives magnetic energy from the PCD.

4. The PICC of claim 1, wherein the BLE radio is configured to communicate login information with an external device.

5. A tangible machine-readable non-transitory storage medium that contains instructions, which when executed by one or more processors result in performing operations comprising:
   discovering a proximity integrated circuit card (PICC) within a magnetic field range of a proximity coupling device (PCD);
   identifying the discovered PICC as having a Bluetooth Low Energy (BLE) communication platform powered by harvested energy;
   communicating with the PCD through the BLE communication platform of the PICC;
   increasing duty cycle of the PCD to expose the PICC to increased magnetic field generated by the PCD to thereby charge the PICC during the duty cycle;

resuming default duty cycle when the PICC is outside of the magnetic field range of the PCD.

6. The tangible machine-readable non-transitory storage medium of claim 5, wherein discovering the PICC within the magnetic field range further comprises transmitting a request (REQ) command to the PICC and receiving an answer to request (ATQ) from the PICC.

7. The tangible machine-readable non-transitory storage medium of claim 6, wherein discovering the PICC within a magnetic field range further comprises determining whether a plurality of designated bits in the ATQ indicate energy harvest requirement.

8. The tangible machine-readable non-transitory storage medium of claim 7, wherein the instructions further comprise increasing duty cycle of the magnetic field if energy harvest requirement is indicated.

9. The tangible machine-readable non-transitory storage medium of claim 5, wherein the instructions further comprise detecting movement of the PICC away from the PCD.

10. A proximity coupling device (PCD) comprising one or more processors and circuitry, the circuitry including:
    a first logic to discover a proximity integrated circuit card (PICC) within a magnetic field range of the PCD;
    a second logic to determine the discovered PICC as having a Bluetooth Low Energy (BLE) radio and to direct BLE communication between the PCD and the PICC using the BLE radio, the second logic to identify the discovered PICC as having a Bluetooth Low Energy (BLE) communication platform powered by harvested energy;
    a third logic to increase duty cycle of the PCD to expose the PICC to increased magnetic field and to thereby charge the PICC during the duty cycle, the third logic configured to resume a default duty cycle when the PICC is outside of the magnetic field range of the PCD.

11. The PCD of claim 10, wherein the first logic discovers the PICC within the magnetic field by transmitting a request (REQ) command to the PICC and receiving an answer to request (ATQ) from the PICC.

12. The PCD of claim 11, wherein the second logic determines whether a plurality of designated bits in the ATQ indicate BLE availability.

13. The PCD of claim 12, wherein the third logic increases duty cycle of the magnetic field for a duration only if the BLE is available.

14. The PCD of claim 13, wherein the first logic further detects movement of the PICC away from the PCD and causes the third logic to resume the default duty cycle.

* * * * *